Dec. 17, 1940.   E. A. RUSSELL ET AL   2,224,989
HIGH PRESSURE STEAM TRAP.
Filed May 11, 1938   2 Sheets-Sheet 2
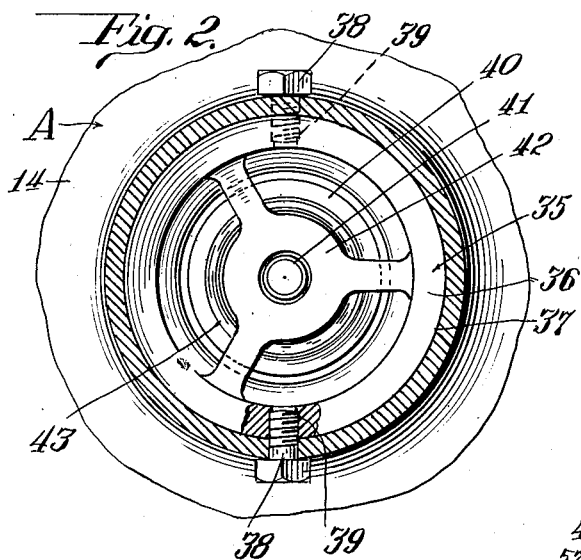
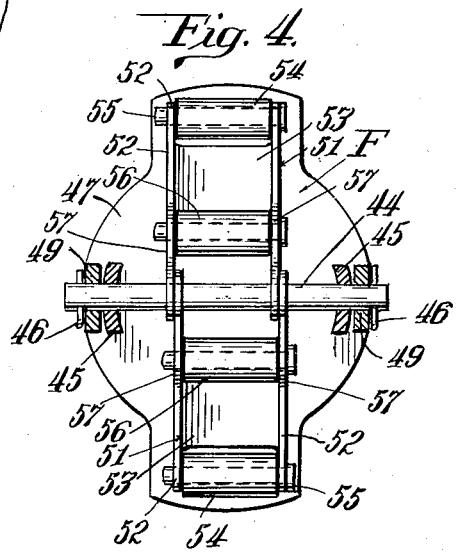
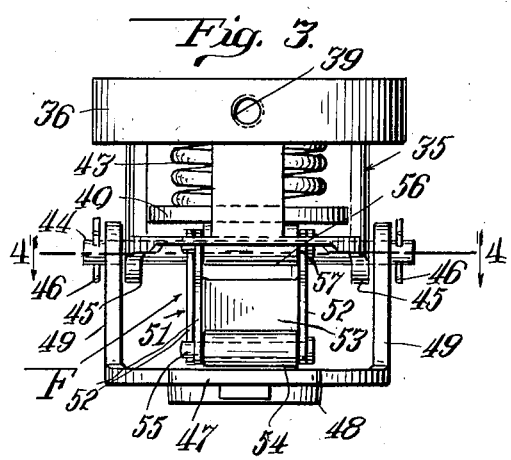
Inventors
Edward A. Russell
and John Yindrock
By Barnett & Truman
Attorneys Patented Dec. 17, 1940

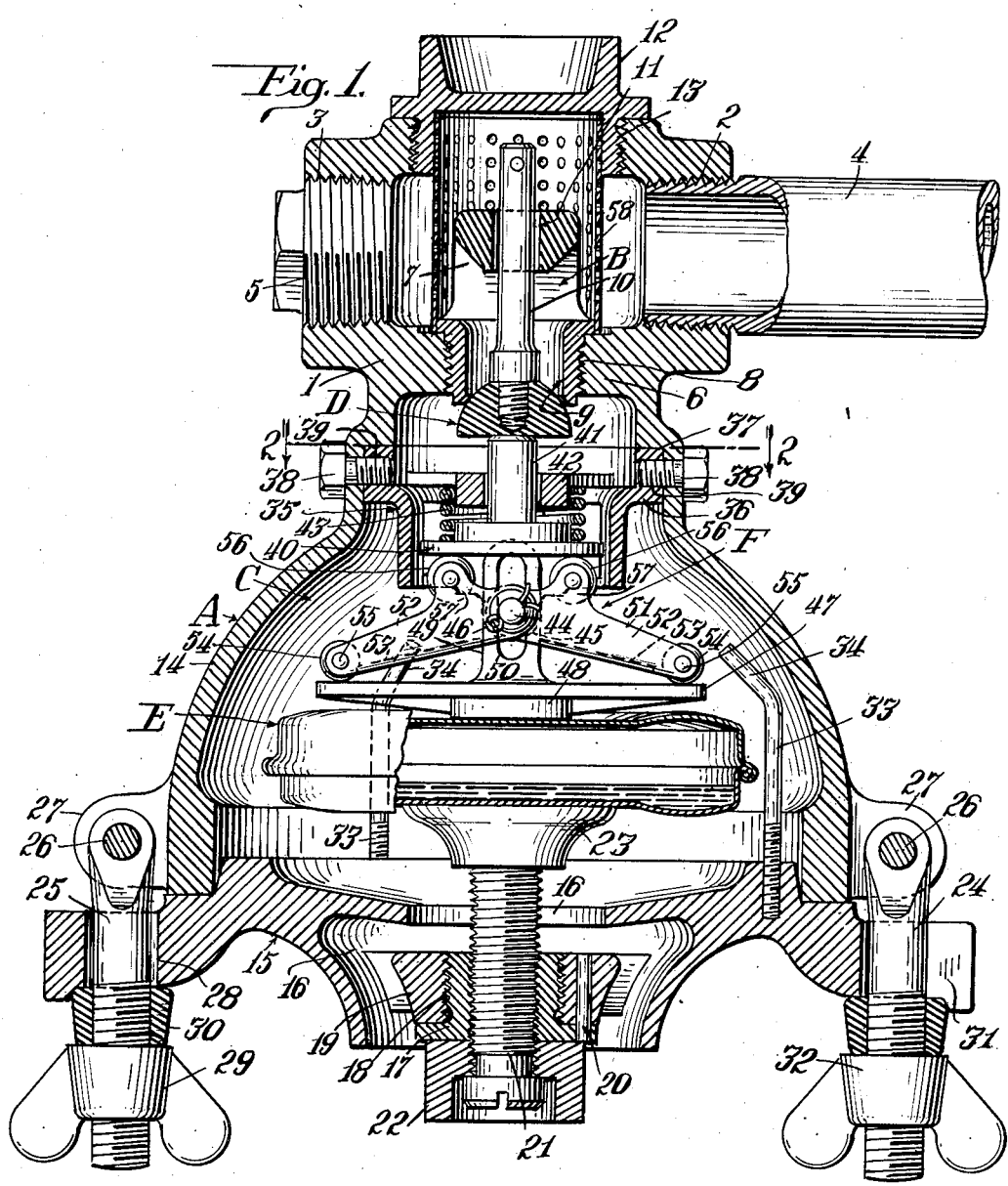

2,224,989

UNITED STATES PATENT OFFICE 2,224,989

HIGH PRESSURE STEAM TRAP

Edward A. Russell and John Yindrock, Chicago, Ill., assignors to Vapor Car Heating Company, Inc., Chicago, Ill., a corporation of New York Application May 11, 1938, Serial No. 207,315

8 Claims. (Cl. 236—58)

This invention relates to certain new and useful improvements in a steam trap, that is, a device adapted to permit the escape of air and condensate from a steam heating system, or other system utilizing steam without permitting the excessive escape of steam from the system.

A device of the kind in which this invention is incorporated comprises a valved passage leading from the steam system into a chamber in which a thermostatic element is located. Air and condensate can drain into this chamber and escape therefrom, but when steam enters this chamber the thermostatic element will be expanded or moved thereby and through suitable power-transmitting mechanism will close the valve and thus prevent the further escape of steam.

The present invention relates particularly to a steam trap of this character adapted to be used with a system employing steam under rather high pressure. Since the valve is positioned to close against the steam pressure a considerable amount of power is required to close the valve, whereas the force derived from the thermostatic element is necessarily limited. According to this invention, an improved power-transmitting unit is interposed between the thermostatic element and the valve, this unit being adapted to change a relatively large movement of the thermostatic element under low pressure into a relatively small movement of the valve under greatly increased pressure. This unit or assembly, which is fixedly supported within the trap casing, but is easily bodily removable therefrom, comprises an improved compound-leverage system for increasing the power derived from the thermostatic element.

The principal object of this invention is to provide an improved steam trap of the type briefly described hereinabove and disclosed more in detail in the specifications which follow.

Another object is to provide an improved power-transmitting unit for use in a steam trap.

Another object is to provide a power-transmitting assembly of this character which is readily detachable or removable as a unit from the steam trap.

Other objects and advantages of this invention will be more apparent from the following detailed description of one approved form of apparatus constructed and operating according to the principles of this invention.

In the accompanying drawings:

Fig. 1 is a central vertical section through the assembled trap.

Fig. 2 is a horizontal section taken substantially on the line 2—2 of Fig. 1.

Fig. 3 is a side elevation of the power-transmitting unit, the unit being viewed at right angles to the position shown in Fig. 1.

Fig. 4 is a horizontal section through this unit taken substantially on the line 4—4 of Fig. 3.

Briefly described, the trap casing A houses the steam chamber B and the thermostatic chamber or drain chamber C. These two chambers are connected by a steam passage which may be closed by the movable valve member D, and the thermostatic element E which moves this valve is housed within chamber C. Thermostat E actuates the valve D through the interposed power-transmitting unit, indicated generally at F, which, in combination with the other elements, constitutes the novel feature of the present invention.

The casing A comprises the upper valve casing 1 which encloses the steam chamber B, and valve casing 1 is provided with one or more inlet ports, such as 2 and 3. In the present instance the steam supply pipe 4 communicates with port 2 and port 3 is closed by a plug 5. It will be understood that two or more pipes might lead into chamber B. For example, pipe 4 may be the return or drain pipe at the outlet end of a steam-heating system. Chambers B and C are separated by a web 6 in which a cage member 7 is threaded at 8. This cage is formed with the steam passage 9 connecting the two chambers, and the movable valve member D is adapted to close the lower outlet end of this passage. Valve D is supported by stem 10 which is slidably guided at 11 in the upper portion of cage 7. Cage 7 and the valve assembly carried thereby are inserted through an opening in the upper portion of casing 1 normally closed by plug or cover 12, threaded into the casing at 13.

The lower portion of casing A expands outwardly and downwardly as a bell-shaped structure, as indicated at 14, so as to enclose the thermostatic chamber C, and is open at its lower end. This lower end is partially closed by the cover plate 15 provided with the central passages 16 through which air or non-condensable gases can escape and condensate can drain out. An internally and externally threaded plug 17 is threaded at 18 into web 19 formed in closure plate 15 intermediate the drain passages 16, this plug being locked in place by pin 20. The adjusting screw 21 is threaded within plug 17 and locked in place by lock nut 22. Screw 21 carries at its upper end the pedestal 23 which engages and supports the lower surface of thermostatic disc E.

A pair of similar threaded bolts 24 and 25 are hinged at their upper ends at 26 in ears 27 formed on the lower portion of casing A. Bolt 25 extends through a hole or passage 28 in one side of closure plate 15, and the plate is locked in position against the lower end of casing A by the nut 29 and washer 30. The other bolt 24 extends through an open slot 31 in the opposite side of closure plate 15 and this side of the plate is held in position by nut 32. It will be apparent that by loosening the nuts 29 and 32 and swinging bolt 24 out of slot 31, that the closure plate 30 may be swung down about the opposite pivotal axis 26, thus permitting access to the thermostatic chamber C and the mechanism therein. A plurality of guide pins 33 extending upwardly from closure plate 15 and having inturned ends 34 loosely hold the thermostatic disc E in position and prevent its disengagement from plate 15 when this plate is swung downwardly, as already described. It will be apparent that the closure plate 15 can be entirely removed by unscrewing nut 29 from bolt 25.

The thermostatic member E may be of well known form comprising a hollow sealed thin-metal disc partially filled with a temperature-responsive fluid. When this member is surrounded by steam and consequently heated to steam temperature, it will expand, and since the lower wall of the disc is supported by the fixed pedestal 23 the upper wall of the disc will move upwardly and thus transmit valve-actuating power through the power-transmitting mechanism F, as hereinafter described. It will be understood that other forms of thermostatic members might be used, so long as this element is adapted to provide an upward thrust when heated against the lower movable member of the power-transmitting unit F.

All of the parts of the novel power-transmitting assembly F are supported by a cage structure 35 having an upper collar member 36 which fits snugly within a shouldered portion 37 at the top of main casing 14 and which is held removably in place by a pair of screw bolts 38 passed through casing 14 and engaging threaded openings 39 in the collar 36. By merely removing bolts 38 the entire assembly F may be removed as a unit through the lower portion of the casing after closure member 15 and thermostatic disc E have been swung out of the way. This permits easy assembly or disassembly of the device in the event that any repairs or replacements are necessary.

An upper horizontally positioned disc or plate 40 is guided for vertical sliding movement within cage 35 and is provided with an upwardly projecting stem 41 guided for sliding movement in a central opening in web 42 formed within cage 35. A compression spring 43 is confined between the upper surface of plate 40 and web 42 so as to normally urge the movable plate 40 and stem 41 downwardly. The upper end of stem 41 is adapted to engage the lower surface of movable valve member D and force this valve upwardly to closed position when plate 40 is elevated against the resistance of spring 43.

A transversely extending shaft or pin 44 is mounted in lugs 45 extending downwardly from opposite sides of cage 35, the shaft being held in place by cotter-pins 46 in the end portions thereof. A lower, substantially horizontally positioned, plate member 47 has a central stud portion 48 on its lower surface adapted to engage the upper surface of thermostatic disc E so that plate 47 will be moved upwardly by the expansion of the thermostat. A pair of lugs or arms 49 extending upwardly from opposite sides of plate 47 are formed with vertical slots 50 engaging over the end portions of transverse shaft 44 so that plate 47 will be loosely supported by this shaft and guided for vertical movement thereby.

A pair of similar lever-members 51 are pivotally mounted at their opposed inner ends on transverse shaft 44. Each of these levers comprises a pair of parallel vertically positioned side arms 52 connected by a central lower web portion 53. The inner ends of the side arms 52 are provided with openings by which the levers are pivoted on shaft 44. A roller 54 is pivoted by means of a pin 55 between the side arms 52 at the outer end of each lever 51. These rollers 54 engage the upper surface of plate 47, adjacent opposite sides thereof. A second similar pair of rollers 56 are pivotally mounted in lugs or projections 57 extending upwardly from side arms 52 of the lever adjacent the inner pivoted ends thereof. These rollers 56 engage the lower surface of the upper movable plate member 40.

It will be noted that these levers 51 are of the second class, being fulcrumed at one end with the power applied at the other end and the force transmitted from a shorter intermediate arm. As a consequence a quite considerable vertical movement of actuating plate 47 transmitted through rollers 54 to the outer ends of the levers results in a much shorter vertical movement of plate 40 as pressed upwardly by the other pair of rollers 56 mounted on the short arms of the levers. As a result a relatively large movement of the upper surface of thermostatic disc E under a rather low pressure provided by the expansion of the thermostatic member, results in a relatively small movement of the upper plate 40 and stem 41 under greatly increased pressure. The stem 41 is therefore able to move valve member D through the relatively short distance necessary to close the valve with a considerable force, sufficient to overcome the steam pressure exerted on the upper surface of this valve member. The force thus applied is also sufficient to overcome the resistance of spring 43, which spring need only be strong enough to return the parts to the normally lowered expanded position. It will be noted that the lower actuating plate 47 is freely hinged on the supporting shaft 44 for movement in any direction, and the leverage system has a free rolling engagement on the opposed surfaces of the two relatively movable plates 47 and 40, so that the device is entirely self-centering and cannot bind within any reasonable limits. The novel power-transmitting assembly F is entirely self-supporting, that is, the parts will not become detached from one another when this unit is removed from the steam-trap assembly, and the stud 48 on the lower plate and the upper end of stem 41 simply press against the opposed surfaces of the thermostatic disc E and valve D, respectively, so that there are no attachments to be made or disconnected. All that is necessary is to insert the unit F within the trap casing A and secure it in place by screws 38, and then swing closure plate 15 and trap E into closed position. It will also be apparent that the valve assembly may be removed through the upper portion of the casing by simply removing closure plug 12 and unscrewing the cage 7. A cylindrical strainer 50 may also be inserted through the upper casing opening 13 so as to surround the valve structure, the strainer being held in place by closure plug 12.

We claim:

1. In a steam trap, in combination with a valve member positioned to be moved against steam pressure to closed position and a thermostatic disc adapted to expand when exposed to steam, a power-transmitting unit adapted to be interposed between the disc and valve and comprising a pair of movable plates one having a portion adapted to engage the disc and the other a portion to engage the valve, means for supporting and guiding the plates for independent movement in the same direction, and a leverage system also carried by the supporting means and interposed between the plates for changing a relatively large movement of one plate under low pressure into a relatively small movement of the other plate under increased pressure.

2. In a steam trap, in combination with a valve member positioned to be moved against steam pressure to closed position and a thermostatic disc adapted to expand when exposed to steam, a power-transmitting unit adapted to be interposed between the disc and valve and comprising a supporting cage, a plate member mounted in the cage and having a projecting stem on its outer face adapted to engage and move the valve member, a second movable plate member having a portion on its outer face adapted to be engaged and moved by the disc, a transverse shaft mounted in the cage and extending between the opposed inner faces of the plate members, means loosely supporting the second plate member from the end portions of this shaft and guiding it for movement toward or from the first plate, a pair of similar levers pivoted at their inner opposed ends on the shaft, rollers mounted in the outer end portions of the levers and engaging the inner face of the second plate, a second pair of rollers carried by the levers intermediate their ends and adjacent the pivotal axis of the levers and engaging the inner face of the first mentioned plate, and a spring mounted in the cage and engaging the outer face of the first plate to urge this plate toward the second plate and thus extend the leverage system and separate the plates.

3. A steam trap comprising a casing enclosing an upper steam chamber and a thermostatic chamber therebelow, means for conducting steam into the steam chamber, means for draining condensate from the thermostatic chamber, a vertical passage in the casing connecting the chambers, a valve member supported in the casing for upward movement in opposition to the steam pressure to close the lower end of the passage, a thermostatic disc, means for supporting the disc from one face thereof in the thermostatic chamber below the passage and valve member so that when expanded by the presence of steam in this chamber it will expand and move its other face upwardly toward the valve member, and a self-contained power-transmitting unit supported removably within the upper portion of the thermostatic chamber and interposed between and centered about the same vertical axis as the disc and valve member for receiving a relatively long upward thrust from the disc under low pressure and imparting a relatively short upward thrust to the valve member under increased pressure.

4. A steam trap comprising a casing enclosing an upper steam chamber and a thermostatic chamber therebelow, means for conducting steam into the steam chamber, means for draining condensate from the thermostatic chamber, a vertical passage in the casing connecting the chambers, a valve member supported in the casing for upward movement in opposition to the steam pressure to close the lower end of the passage, a thermostatic disc, means for supporting the disc from one face thereof in the thermostatic chamber below the passage and valve member so that when expanded by the presence of steam in this chamber it will expand and move its other face upwardly toward the valve member, and a self-contained power-transmitting unit supported removably within the upper portion of the thermostatic chamber and interposed between and centered about the same vertical axis as the disc and valve member and comprising a self-contained leverage system for receiving a relatively long upward thrust from the disc under low pressure and imparting a relatively small upward thrust to the valve member under increased pressure.

5. A steam trap comprising a casing enclosing a steam chamber and a thermostatic chamber, means for conducting steam into the steam chamber, means for draining condensate from the thermostatic chamber, a passage in the casing connecting the chambers, a valve member supported in the casing for movement in opposition to the steam pressure to close the passage, a thermostatic disc, means for supporting the disc from one face thereof in the thermostatic chamber so that when expanded by the presence of steam in this chamber it will expand and move its other face toward the valve member, and a power-transmitting unit supported within the casing and interposed between the disc and valve member for changing a relatively large movement of the disc under low pressure to a relatively small movement of the valve member under increased pressure, said unit comprising a cage removably mounted within the casing, a plate guided for bodily movement within the cage and having a stem projecting from its outer face into position to engage and move the valve member, a spring mounted in the cage to urge the plate and stem inwardly away from the valve member, a second plate positioned to be engaged on its outer face by the disc and freely supported by the cage for movement toward or from the first mentioned plate, a pair of similar levers pivotally mounted in the cage at their inner opposed ends between the plates, rollers mounted in the outer ends of said levers and engaging the inner surface of the second plate, and a second pair of rollers respectively mounted on the levers intermediate their ends and adjacent the pivoted inner ends of the levers and engaging the inner surface of the first mentioned plate.

6. A steam trap comprising a casing enclosing a steam chamber and a thermostatic chamber, means for conducting steam into the steam chamber, means for draining condensate from the thermostatic chamber, a passage in the casing connecting the chambers, a valve member supported in the casing for movement in opposition to the steam pressure to close the passage, a thermostatic disc, means for supporting the disc from one face thereof in the thermostatic chamber so that when expanded by the presence of steam in this chamber it will expand and move its other face toward the valve member, and a power-transmitting unit supported within the casing and interposed between the disc and valve member for changing a relatively large movement of the disc under low pressure to a relatively small movement of the valve member under increased pressure, said unit comprising a cage removably mounted within the casing, a plate guided for bodily movement within the cage and having a stem projecting from its outer face into position to engage and move the valve member, there being a web within the cage in which the stem is guided, a spring interposed between the web and plate to urge the plate away from the valve member, a second movable plate member having a portion on its outer face adapted to engage and be moved by the disc, a transverse shaft mounted in the cage and extending between the opposed inner faces of the plates, slotted lugs on the second plate slidably engaging the end portions of the shaft for supporting the second plate and guiding it for movement toward or from the first plate, a pair of similar levers pivoted at their inner opposed ends on the shaft, rollers mounted in the outer end portions of the levers and engaging the inner face of the second plate member, and a second pair of rollers respectively carried by the levers intermediate their ends and adjacent the pivotal axis of the levers and engaging the inner face of the first plate member.

7. A power-transmitting unit for a steam-trap comprising a supporting cage adapted to be detachably mounted in the trap, a plate guided for bodily movement in the cage and having a power-transmitting stem projecting outwardly therefrom, a spring mounted in the cage to urge the plate and stem inwardly, a second power-transmitting plate positioned substantially parallel with the first plate and freely supported by the cage for movement toward or from the first plate, a pair of similar levers pivotally mounted in the cage at their inner opposed ends between the plates, rollers mounted in the outer ends of said levers and engaging the inner surface of the second plate, and a second pair of rollers respectively mounted on the levers intermediate their ends and adjacent the pivoted inner ends thereof and engaging the inner surface of the first mentioned plate.

8. A power-transmitting unit for a steam-trap comprising a supporting cage adapted to be detachably mounted in the trap, a plate guided for bodily movement in the cage and having a power-transmitting stem projecting outwardly therefrom, a web within the cage through which the stem is slidably guided, a spring surrounding the stem and interposed between the web and plate to normally urge the plate and stem inwardly, a second power transmitting plate positioned substantially parallel to but spaced from the first plate, a transverse shaft mounted in the cage between the plates, there being inwardly extending slotted lugs on the second plate engaging the end portions of the shaft to support and guide the second plate for movement toward or from the first plate, a pair of similar levers pivotally mounted on the shaft at their inner opposed ends, rollers mounted in the outer ends of the levers and engaging the inner face of the second plate, and a second pair of rollers respectively mounted on the levers intermediate their ends and adjacent their pivoted inner ends and engaging the inner surface of the first mentioned plate.

EDWARD A. RUSSELL.
JOHN YINDROCK.